United States Patent
Yang et al.

(10) Patent No.: US 9,030,984 B2
(45) Date of Patent: May 12, 2015

(54) TRANSMISSION POWER CONTROL SCHEMES FOR D2D COMMUNICATIONS

(71) Applicant: Intel Corporation, Santa Clara, CA (US)

(72) Inventors: Rongzhen Yang, Shanghai (CN); Hujun Yin, Saratoga, CA (US); Andreas Schmidt, Braunschweig (DE); Feng Chen, Shanghai (CN); Jong-Kae Fwu, Sunnyvale, CA (US)

(73) Assignees: Intel Corporation, Santa Clara, CA (US); Intel Mobile Communications GmbH, Neubiberg (DE)

( * ) Notice: Subject to any disclaimer, the term of this patent is extended or adjusted under 35 U.S.C. 154(b) by 86 days.

(21) Appl. No.: 13/743,652

(22) Filed: Jan. 17, 2013

(65) Prior Publication Data

US 2014/0198694 A1    Jul. 17, 2014

(51) Int. Cl.
  *G08C 17/00* (2006.01)
  *H04W 52/24* (2009.01)
  *H04W 52/36* (2009.01)
  *H04W 72/04* (2009.01)

(52) U.S. Cl.
  CPC .......... *H04W 52/242* (2013.01); *H04W 52/367* (2013.01); *H04W 72/0446* (2013.01)

(58) Field of Classification Search
  USPC ............ 370/328–329, 311; 455/522
  See application file for complete search history.

(56) References Cited

U.S. PATENT DOCUMENTS

| | | |
|---|---|---|
| 2002/0151322 A1 | 10/2002 | Agin et al. |
| 2006/0152285 A1 | 7/2006 | Gustavsson et al. |
| 2008/0242337 A1 | 10/2008 | Sampath et al. |
| 2009/0262670 A1 | 10/2009 | Cho et al. |
| 2013/0223356 A1* | 8/2013 | Khoshnevis et al. ......... 370/329 |
| 2014/0003341 A1* | 1/2014 | Hu et al. ...................... 370/328 |
| 2014/0094213 A1* | 4/2014 | Khoshnevis et al. ......... 455/522 |

FOREIGN PATENT DOCUMENTS

WO    WO-2014113424 A1    7/2014

OTHER PUBLICATIONS

"International Application Serial No. PCT/US2014/011598, International Search Report mailed May 19, 2014", 4 pgs.
"International Application Serial No. PCT/US2014/011598, Written Opinion mailed May 19, 2014", 7 pgs.

* cited by examiner

*Primary Examiner* — Vincelas Louis
(74) *Attorney, Agent, or Firm* — Schwegman Lundberg & Woessner, P.A.; J. Kevin Parker

(57) ABSTRACT

Power control schemes for D2D communications are described. The schemes control the transmission power of a UE during D2D communications in a manner that reduces interference while maintaining the D2D communications link and the cellular link with the eNB. Open-loop and/or closed-loop techniques are employed.

23 Claims, 3 Drawing Sheets

TRANSMISSION POWER CONTROL SCHEMES FOR D2D COMMUNICATIONS

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and uses very lower transmit power. D2D communications is also a powerful way to increase spatial reuse in cellular systems for higher throughput.

One approach to D2D communications as an underlay to an LTE network infrastructure is an out-of-band solution, in which the D2D traffic is unloaded to an unlicensed band (e.g., Wi-Fi as defined by the IEEE 802.11 standards) on the application layer. Another approach is an in-band solution, in which the D2D transmissions take place in the same licensed band used by the LTE network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

D2D communications as an underlay to an LTE network may be implemented as either a centralized or a distributed system. In the latter case, UEs acting as D2D devices communicate directly without any eNB involvement. Such a distributed architecture is only appropriate where the D2D communication is out-of-band, using resources other than the licensed spectrum. When D2D communication takes place in the same licensed band as LTE cellular communications, a centralized system is necessary where the eNB retains control of the radio resource. That is, the eNB is responsible for permitting D2D communications between UEs to take place and for allocating the time-frequency resources used in the D2D links. Controlling the transmission power of D2D UEs is an important factor in determining how well a centralized D2D system performs. Power control is important both for the purpose of conserving battery power in the UEs and for the purpose of interference management to reduce intercell interference between the home cell and neighboring cells and to reduce intracell interference in the situation where the D2D links share resources with the cellular network. Described herein is a power control architecture for supporting intracell D2D communications with centralized control.

Figure 1:
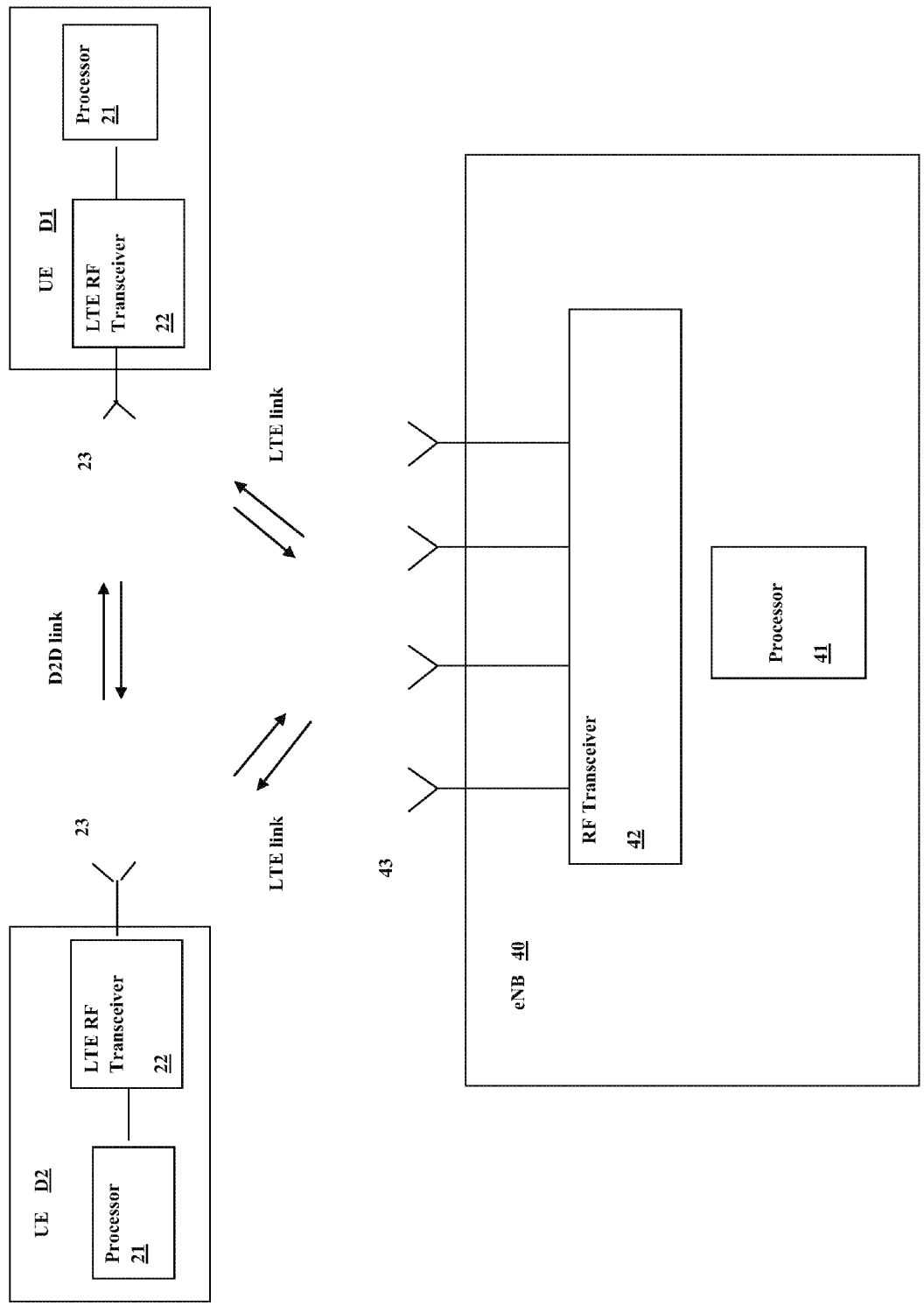
FIG. 1 shows example UE devices for D2D communications and an eNB.

FIG. 1 shows an example of a UE 10 and a UE 20, each of which incorporates a processor 21 interfaced to a radio-frequency (RF) transceiving circuitry 22 that is connected to one or more antennas 23. A base station or eNB 40 is shown with a processor 41 interfaced to an RF transceiving circuitry 42 that is connected to a plurality of antennas 43. The illustrated components are intended to represent any type of hardware/software configuration for providing a air interfaces for both LTE and D2D communication and for performing the processing functions as described herein. In the embodiment shown in the figure, UEs 10 and 20 both communicate with the eNB 40 via LTE links and with one another via D2D link. The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest time-frequency resource in LTE. LTE transmissions in the time domain are organized into radio frames, each having a duration of 10 ms. Each radio frame consists of 10 sub-frames, and each sub-frame consists of two consecutive 0.5 ms slots.

Figure 2:
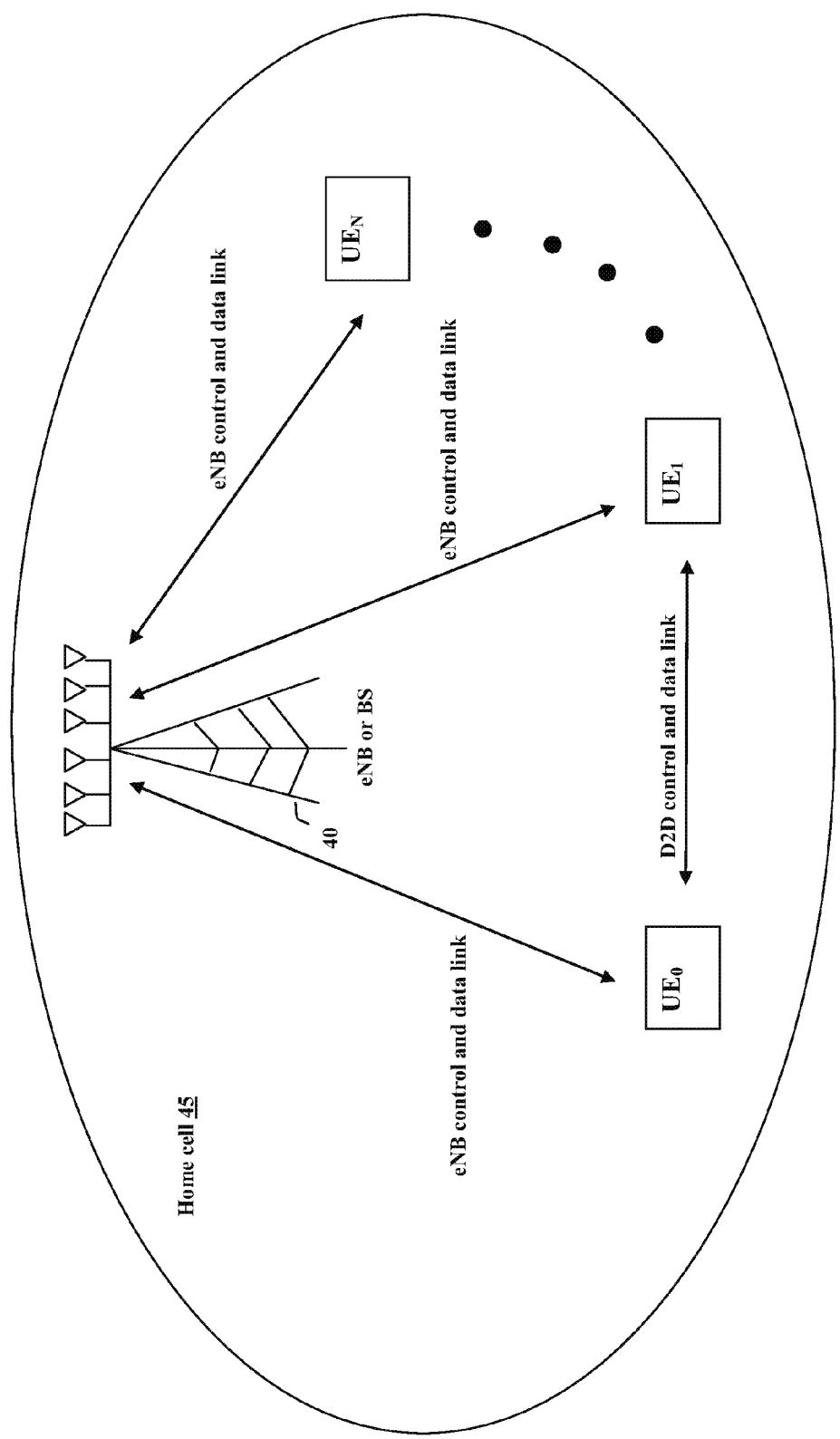
FIG. 2 shows an example of a home cell served by an eNB and having at least two D2D UEs.

FIG. 2 shows an example of an eNB 40 serving a home cell 45 in which a number of UEs designated $UE_0$ through $UE_N$ are located. All of the UEs communicate with the eNB via a UE-to-eNB link. $UE_0$ and $UE_1$ are shown as being D2D UEs communicating with one another via a D2D link. In a centralized intracell D2D system, each of the D2D UEs needs to maintain communication links to both the eNB to its D2D partner UE. A power control subsystem governing a D2D UE therefore needs to: 1) ensure sufficient power is supplied for the communication link to the eNB for both uplink data and control channels and to maintain the D2D communication link; and 2) balance the power requirements for the communications links with the interference that might be caused to neighbor cells and, in the case where resources are shared within the cell by both D2D and cellular communications, to other UEs in the home cell.

Power control for UEs may be implemented in an open-loop and/or a closed-loop manner. Open-loop power control involves the UE adjusting its transmission power from some pre-set level deemed necessary to maintain the communications link to a level necessary to compensate for the path loss of the transmitted signal but not exceeding a pre-set maximum power level. Path loss may be estimated by determining the power of a reference signal received from the UE's receiver which, due to channel reciprocity, will be the same as the path loss of a signal transmitted to the receiver. The path loss compensation may be implemented to either fully or partially compensate for the path loss by increasing transmission power, the latter referred to as fractional power control (FPC). Closed-loop power control, which may be applied in conjunction with open-loop power control, involves the UE adjusting its transmission power in accordance with power control commands sent from the UE's receiver, which the receiver may base upon its received SINR (signal-to-noise-plus-interference ratio). The power control commands may be absolute, specifying a particular transmission power level, or may be cumulative so as to increment or decrement the current transmission power level by some specified amount.

In one embodiment, a power control scheme for D2D UEs is represented by the following equation that defines how the UE adjusts its transmission power level during D2D communications:

$$P_{D2D}(i) = \min(P_{D2D,MAX}, P_{D2D,OLPC}(i) + P_{D2D,CLPC}(i))$$

where $P_{D2D}$ (i) is the decided transmission power level for D2D communications, $P_{D2D,MAX}$ is a maximum allowed transmission power during D2D communications, $P_{D2D,\ OLPC}$ (i) is the open-loop power control function, $P_{D2D,CLPC}$ (i) is the closed-loop power control function, and i is the LTE sub-frame index.

In one embodiment, the open-loop power control function $P_{D2D,\ OLPC}$ (i) may be expressed as being made up of two parts as follows:

$$P_{D2D,OLPC}(i) = \min(P_{D2D,OLPC,Part\_1}(i), P_{D2D,OLPC,Part\_2})$$

$P_{D2D,\ OLPC,\ Part\_1}$ (i) represents the part of the open-loop control function that maintains the D2D link while minimizing interference to others and may be expressed as follows:

$$P_{D2D,OLPC,Part\_1}(i) = P_{0,D2D} + L_{D2D} + SINR_{target}$$

where $P_{0,D2D}$ is a base power setting for D2D communications, $SINR_{target}$ is a target signal to interference and noise ratio set for D2D communications, and $L_{D2D}$ is a measured path loss value for the communications path between the device and the partner UE. Fractional power control may or may not be applied. $P_{D2D,\ OLPC,\ Part\_2}$ (i) represents the part of the open-loop control function that maintains the link with the eNB with minimized interference to other cells and may be represented by:

$$P_{D2D,OLPC,Part\_2}(i) = P_{0,eNB} + \alpha(L_{eNB})$$

where $P_{0,eNB}$ is a base power setting for communicating with the eNB, $\alpha$ is a fractional power control parameter between 0 and 1, and $L_{eNB}$ is a measured path loss value for the communications path between the device and the eNB. In various embodiments, the open-loop power control function may be applied in a manner that only maintains the D2D link with minimized interference as:

$$P_{D2D,OLPC}(i) = P_{D2D,OLPC,Part\_1},$$

applied so as to only maintain the eNB link with minimized interference as:

$$P_{D2D,OLPC}(i) = P_{D2D,OLPC,Part\_2},$$

or totally disabled as expressed by:

$$P_{D2D,OLPC}(i) = 0$$

In this latter case, only closed-loop power control as described below is applied.

In one embodiment, the closed-loop power control function may be expressed as:

$$P_{D2D,CLPC}(i)) = f_{D2D}(i)$$

where $f_{D2D}$ (i) is a function of a value transmitted by the partner UE. The function $f_{D2D}$ (i) may operate in an absolute manner such that:

$$f_{D2D}(i) = \Delta_{D2D}(i)$$

where $\Delta_{D2D}$ (i) is an absolute transmission power value transmitted by the partner UE or may operate in cumulative manner such that:

$$f_{D2D}(i) = f_{2D}(i-1) + \Delta_{D2D}(i)$$

where $\Delta_{D2D}$ (i) is a positive or negative incremental power control command transmitted by the second UE and where $f_{D2D}$ (i) is initialized to zero. In another embodiment, the closed-loop power control function $P_{D2D,CLPC}$ (i)) is defined as:

$$P_{D2D,CLPC}(i)) = f_{D2D}(i) + f_{eNB}(i)$$

where $f_{D2D}$ (i) is defined as per the alternatives described above and $f_{eNB}$ (i) is a function of a value transmitted by the eNB. The function $f_{eNB}$ (i) may operate in an absolute manner such that:

$$f_{eNB}(i) = \Delta_{eNB}(i)$$

where $\Delta_{eNB}$ (i) is an absolute transmission power value transmitted by the eNB, or may operate in a cumulative manner such that:

$$f_{eNB}(i) = f_{eNB}(i-1) + \Delta_{eNB}(i)$$

where $\Delta_{eNB}$ (i) is a positive or negative incremental power control command transmitted by the eNB and where $f_{eNB}$ (i) is initialized to zero.

Figure 3:
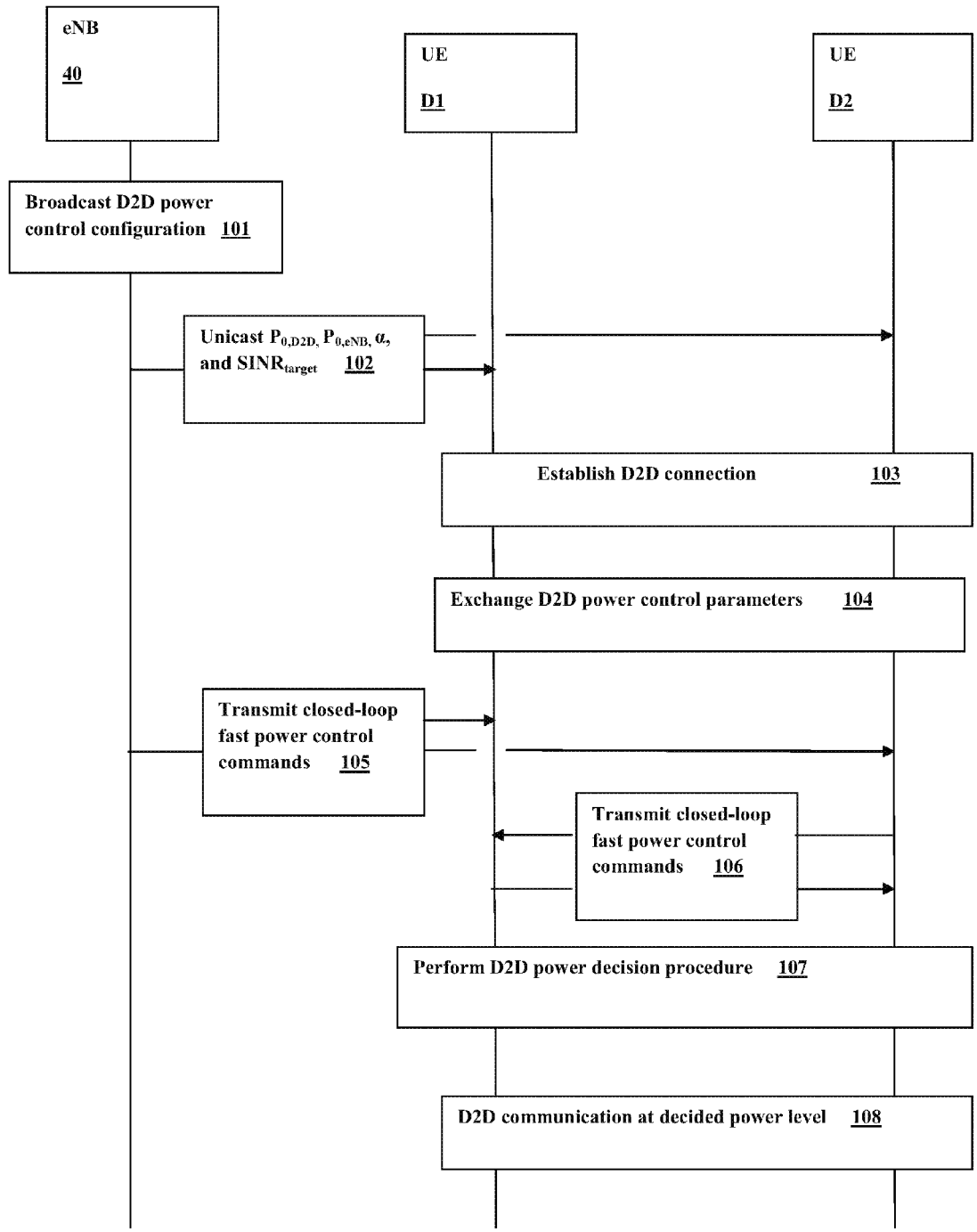
FIG. 3 illustrates an example power control scheme for supporting D2D communications.

FIG. 3 illustrates an example D2D power control scheme with respect to the eNB 40 and paired UEs D1 and D2 that are to establish a D2D communications session between each other. At step 101, the eNB 40 may broadcast values of certain D2D power control parameters to all of the UEs in its coverage area. The broadcasting may occur periodically at a period set by the eNB configuration. The broadcasted parameters may include the base power level setting for D2D communication $P_{0,D2D}$, the base power level setting for inter-cell interference control $P_{0,eNB}$, the fractional power control parameter $\alpha$ for interference control, and the target signal-to-noise-plus-interference ratio $SINR_{target}$ set for D2D communication. At step 102, the eNB may unicast the $P_{0,D2D}$, $P_{0,eNB}$, $\alpha$, and $SINR_{target}$ parameters to particular UEs such as UEs D1 and D2 shown in the figure. If a parameter is both broadcasted and unicasted to a particular UE, the unicasted parameter value may override the broadcasted value. At step 103, UEs D1 and D2 execute the procedures to set up a D2D communications session which may include, after synchronization with the eNB, requesting of time-frequency resources from the eNB and receiving authorization from the eNB. At step 104, the UEs D1 and D2 may exchange certain D2D power control parameters. For example, the $P_{0,D2D}$ may be signaled from UE D1 to UE D2 based upon the received interference power level at UE D1. Similarly, the parameter $SINR_{target}$ may be transmitted from UE D1 to UE D2 based upon the received interference power level at UE D1. The system configuration may be such that, if parameter values have previously been either broadcasted or unicasted to a UE from the eNB, the parameter values received from a UE will take precedence and override the previously received values. Step 105, which may be performed at any time, represents that the eNB transmits closed-loop fast power control commands $\Delta_{eNB}$ (i) to either or both of the paired UEs. The power commands may be coded, for example, as one-bit commands (+1 dB, −1 dB) or two-bit commands (−0.5 dB, 0 dB, +0.5 dB, +1 dB) for the $\Delta_{eNB}$ (i) parameter. Step 106, which also may be performed at any time, represents that the a D2D UE transmits closed-loop fast power control commands $\Delta_{D2D}$ (i) to its partner UE. The power commands may be coded, for example, as one-bit commands (+1 dB, −1 dB) or two-bit commands (−0.5 dB, 0 dB, +0.5 dB, +1 dB) for the $\Delta_{D2D}$ (i) parameter. At step 107, the UEs D1 and D2 decide their transmission power levels based upon the previously signaled parameter values. Step 108 represents D2D communication between UE D1 and D2 at the decided power level.

Example Embodiments

In one embodiment, UE device comprises: a radio transceiver for providing an air interface for communicating with an eNB and for D2D communications and processing circuitry connected to the radio transceiver to: receive allocations of time-frequency resources for D2D communications from the eNB; establish a D2D communications session with a second UE and exchange D2D power control parameters with the second UE that include a closed-loop power control function $P_{D2D,CLPC}$; receive an open-loop power control function $P_{D2D, OLPC}$ via the air interface for controlling transmission power during D2D communications; and, maintain the transmission power during D2D transmissions as a function of the open-loop and closed-loop power control functions. The processing circuitry may be further to: maintain the transmission power during D2D transmissions as the value of a function $P_{D2D}$ calculated for each subframe i as:

$$P_{D2D}(i)=\min(P_{D2D,MAX},P_{D2D,OLPC}(i)+P_{D2D,CLPC}(i))$$

where $P_{D2D,MAX}$ is a maximum allowed transmission power during D2D communications. The closed-loop power control function $P_{D2D,CLPC}$ (i)) may be defined as:

$$P_{D2D,CLPC}(i))=f_{D2D}(i)$$

where $f_{D2D}$ (i) is a function of a value transmitted by the second UE. The $f_{D2D}$ (i) function may be defined as:

$$f_{D2D}(i)=\Delta_{D2D}(i)$$

where $\Delta_{D2D}$ (i) is an absolute transmission power value transmitted by the second UE, or defined as:

$$f_{D2D}(i)=f_{D2D}(i-1)+\Delta_{D2D}(i)$$

where $\Delta_{D2D}$ (i) is a positive or negative incremental power control command transmitted by the second UE and where $f_{D2D}$ (i) is initialized to zero. The closed-loop power control function $P_{D2D,CLPC}$ (i)) may be defined as:

$$P_{D2D,CLPC}(i))=f_{D2D}(i)+f_{eNB}(i)$$

where $f_{D2D}$ (i) is a function of a value transmitted by the second UE and $f_{eNB}$ (i) is a function of a value transmitted by the eNB. The $f_{eNB}$ (i) function may be defined as:

$$f_{eNB}(i)=\Delta_{eNB}(i)$$

where $\Delta_{eNB}$ (i) is an absolute transmission power value transmitted by the eNB or defined as:

$$f_{eNB}(i)=f_{eNB}(i-1)+\Delta_{eNB}(i)$$

where $\Delta_{eNB}$ (i) is a positive or negative incremental power control command transmitted by the eNB and where $f_{eNB}$ (i) is initialized to zero. The open-loop power control function $P_{D2D, OLPC}$ may be set to a constant zero value. The open-loop power control function $P_{D2D, OLPC}$ may be defined as:

$$P_{D2D,OLPC}(i)=P_{0,eNB}+\alpha(L_{eNB})$$

where $P_{0,eNB}$ is a base power setting for communicating with the eNB, $\alpha$ is a fractional power control parameter between 0 and 1, and $L_{eNB}$ is a measured path loss value for the communications path between the device and the eNB. The open-loop power control function $P_{D2D, OLPC}$ may be defined as:

$$P_{D2D,OLPC}(i)=P_{0,eNB}+\alpha(L_{eNB})$$

where $P_{0,eNB}$ is a base power setting for communicating with the eNB, $\alpha$ is a fractional power control parameter between 0 and 1, and $L_{eNB}$ is a measured path loss value for the communications path between the device and the eNB. The open-loop power control function $P_{D2D, OLPC}$ may be defined as:

$$P_{D2D,OLPC}(i)=P_{0,D2D}+L_{D2D}+SINR_{target}$$

where $P_{0,eD2D}$ is a base power setting for D2D communications, $SINR_{target}$ is a target signal to interference and noise ratio set for D2D communications, and $L_{D2D}$ is a measured path loss value for the communications path between the device and the second UE. The open-loop power control function $P_{D2D, OLPC}$ may be defined as:

$$P_{D2D,OLPC}(i)=P_{0,D2D}+L_{D2D}+SINR_{target}$$

where $P_{0,D2D}$ is a base power setting for D2D communications, $SINR_{target}$ is a target signal to interference and noise ratio set for D2D communications, and $L_{D2D}$ is a measured path loss value for the communications path between the device and the second UE. The open-loop power control function $P_{D2D, OLPC}$ may be defined as:

$$P_{D2D,OLPC}(i)=\min(P_{0,eNB}+\alpha(L_{eNB}),P_{0,D2D}+L_{D2D}+SINR_{target})$$

where $P_{0,eNB}$ is a base power setting for communicating with the eNB, $\alpha$ is a fractional power control parameter between 0 and 1, $L_{eNB}$ is a measured path loss value for the communications path between the device and the eNB, $P_{0,D2D}$ is a base power setting for D2D communications, $SINR_{target}$ is a target signal to interference and noise ratio set for D2D communications, and $L_{D2D}$ is a measured path loss value for the communications path between the device and the second UE. The open-loop power control function $P_{D2D, OLPC}$ may be defined as:

$$P_{D2D,OLPC}(i)=\min(P_{0,eNB}+\alpha(L_{eNB}),P_{0,D2D}+L_{D2D}+SINR_{target})$$

where $P_{0,eNB}$ is a base power setting for communicating with the eNB, $\alpha 0$ is a fractional power control parameter between 0 and 1, $L_{eNB}$ is a measured path loss value for the communications path between the device and the eNB, $P_{0,D2D}$ is a base power setting for D2D communications, $SINR_{target}$ is a target signal to interference and noise ratio set for D2D communications, and $L_{D2D}$ is a measured path loss value for the communications path between the device and the second UE.

In another embodiment, method for operating a UE in an LTE cell served by an eNB, comprises: establishing a communication link with the eNB and establishing a D2D communications link with a second UE; receiving a closed-loop power control signal from the second UE designed to maintain the D2D link with reduced interference; receiving an open-loop power control signal from the eNB UE designed to maintain the eNB link with reduced interference; and, maintaining the transmission power level during D2D transmission in accordance with the open-loop and closed-loop power control signals. The method may further comprise: exchanging D2D power control parameters with the second UE that include a closed-loop power control function $P_{D2D,CLPC}$; receiving an open-loop power control function $P_{D2D, OLPC}$ via the air interface for controlling transmission power during D2D communications; maintaining the transmission power during D2D transmissions as a function of the open-loop and closed-loop power control functions. The method may further comprise: maintaining the transmission power during D2D transmissions as the value of a function $P_{D2D}$ calculated for each subframe i as:

$$P_{D2D}(i)=\min(P_{D2D,MAX},P_{D2D,OLPC}(i)+P_{D2D,CLPC}(i))$$

where $P_{D2D,MAX}$ is a maximum allowed transmission power during D2D communications. The open-loop power control function $P_{D2D, OLPC}$ may be defined as:

$$P_{D2D,OLPC}(i)=P_{0,eNB}+\alpha(L_{eNB})$$

where $P_{0,eNB}$ is a base power setting for communicating with the eNB, $\alpha$ is a fractional power control parameter between 0 and 1, and $L_{eNB}$ is a measured path loss value for the communications path between the device and the eNB.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LTE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) device, comprising:
a radio transceiver for providing an air interface for communicating with an evolved node B (eNB) and for device-to-device (D2D) communications; and
processing circuitry connected to the radio transceiver to:
receive allocations of time-frequency resources for D2D communications from the eNB;
establish a D2D communications session with a second UE and exchange D2D power control parameters with the second UE that include a closed-loop power control function $P_{D2D,CLPC}$;
receive an open-loop power control function $P_{D2D, OLPC}$ via the air interface for controlling transmission power during D2D communications;
maintain the transmission power during D2D transmissions as a function of the open-loop and closed-loop power control functions wherein the transmission power $P_{D2D}$ (i) for each subframe i is calculated as:

$$P_{D2D}(i) = \min(P_{D2D,MAX}, P_{D2D,OLPC}(i) + P_{D2D,CLPC}(i))$$

where $P_{D2D,MAX}$ is a maximum allowed transmission power during D2D communications.

2. The device of claim 1 wherein the closed-loop power control function $P_{D2D,CLPC}$ (i)) is defined as:

$$P_{D2D,CLPC}(i) = f_{D2D}(i)$$

where $f_{D2D}$ (i) is a function of a value transmitted by the second UE.

3. The device of claim 2 wherein:

$$f_{D2D}(i) = \Delta_{D2D}(i)$$

where $\Delta_{D2D}$ (i) is an absolute transmission power value transmitted by the second UE.

4. The device of claim 3 wherein:

$$f_{D2D}(i) = f_{2D}(i-1) + \Delta_{D2D}(i)$$

where $\Delta_{D2D}$ (i) is a positive or negative incremental power control command transmitted by the second UE and where $f_{D2D}$ (i) is initialized to zero.

5. The device of claim 2 wherein the open-loop power control function $P_{D2D, OLPC}$ is set to a constant zero value.

6. The device of claim 2 wherein the open-loop power control function $P_{D2D, OLPC}$ is defined as:

$$P_{D2D,OLPC}(i) = P_{0,eNB} + \alpha(L_{eNB})$$

where $P_{0,eNB}$ is a base power setting for communicating with the eNB, α is a fractional power control parameter between 0 and 1, and $L_{eNB}$ is a measured path loss value for a communications path between the device and the eNB.

7. The device of claim 2 wherein the open-loop power control function $P_{D2D, OLPC}$ is defined as:

$$P_{D2D,OLPC}(i) = P_{0,D2D} + L_{D2D} + \text{SINR}_{target}$$

where $P_{0,eD2D}$ is a base power setting for D2D communications, $\text{SINR}_{target}$ is a target signal to interference and noise ratio set for D2D communications, and $L_{D2D}$ is a measured path loss value for a communications path between the device and the second UE.

8. The device of claim 2 wherein the open-loop power control function $P_{D2D, OLPC}$ is defined as:

$$P_{D2D,OLPC}(i) = \min(P_{0,eNB} + \alpha(L_{eNB}), P_{0,D2D} + L_{D2D} + \text{SINR}_{target})$$

where $P_{0,eNB}$ is a base power setting for communicating with the eNB, α is a fractional power control parameter between 0 and 1, $L_{eNB}$ is a measured path loss value for a communications path between the device and the eNB, $P_{0,D2D}$ is a base power setting for D2D communications, $\text{SINR}_{target}$ is a target signal to interference and noise ratio set for D2D communications, and $L_{D2D}$ is a measured path loss value for a communications path between the device and the second UE.

9. The device of claim 1 wherein the closed-loop power control function $P_{D2D,CLPC}$ (i)) is defined as:

$$P_{D2D,CLPC}(i) = f_{D2D}(i) + f_{eNB}(i)$$

where $f_{D2D}$ (i) is a function of a value transmitted by the second UE and $f_{eNB}$ (i) is a function of a value transmitted by the eNB.

10. The device of claim 6 wherein:

$$f_{eNB}(i) = \Delta_{eNB}(i)$$

where $\Delta_{eNB}$ (i) is an absolute transmission power value transmitted by the eNB.

11. The device of claim 9 wherein:

$$f_{eNB}(i) = f_{eNB}(i-1) + \Delta_{eNB}(i)$$

where $\Delta_{eNB}$ (i) is a positive or negative incremental power control command transmitted by the eNB and where $f_{eNB}$ (i) is initialized to zero.

12. The device of claim 9 wherein the open-loop power control function $P_{D2D, OLPC}$ is set to a constant zero value.

13. The device of claim 9 wherein the open-loop power control function $P_{D2D, OLPC}$ is defined as:

$$P_{D2D,OLPC}(i) = P_{0,eNB} + \alpha(L_{eNB})$$

where $P_{0,eNB}$ is a base power setting for communicating with the eNB,
a is a fractional power control parameter between 0 and 1, and $L_{eNB}$ is a measured path loss value for a communications path between the device and the eNB.

14. The device of claim 9 wherein the open-loop power control function $P_{D2D, OLPC}$ is defined as:

$$P_{D2D,OLPC}(i) = P_{0,D2D} + L_{D2D} + \text{SINR}_{target}$$

where $P_{0,D2D}$ is a base power setting for D2D communications, $\text{SINR}_{target}$ is a target signal to interference and noise ratio set for D2D communications, and $L_{D2D}$ is a measured path loss value for a communications path between the device and the second UE.

15. The device of claim 9 wherein the open-loop power control function $P_{D2D, OLPC}$ is defined as:

$$P_{D2D,OLPC}(i)=\min(P_{0,eNB}+\alpha(L_{eNB}),P_{0,D2D}+L_{D2D}+\text{SINR}_{target})$$

where $P_{0,eNB}$ is a base power setting for communicating with the eNB, $\alpha$ is a fractional power control parameter between 0 and 1, $L_{eNB}$ is a measured path loss value for a communications path between the device and the eNB, $P_{0,D2D}$ is a base power setting for D2D communications, $\text{SINR}_{target}$ is a target signal to interference and noise ratio set for D2D communications, and $L_{D2D}$ is a measured path loss value for a communications path between the device and the second UE.

16. A method for operating user equipment (UE) in a Long Term Evolution (LTE) cell served by an eNB, comprising:
    establishing a communication link with the eNB and establishing a D2D communications link with a second UE;
    receiving a closed-loop power control signal from the second UE designed to maintain the D2D link with reduced interference that includes a closed-loop power control function $P_{D2D,CLPC}$;
    receiving an open-loop power control signal from the eNB designed to maintain the eNB link with reduced interference that includes an open-loop power control function $P_{D2D,OLPC}$;
    maintaining a transmission power during D2D transmission in accordance with the open-loop and closed-loop power control signals wherein the transmission power $P_{D2D}(i)$ for each subframe i is calculated as:

$$P_{D2D}(i)=\min(P_{D2D,MAX},P_{D2D,OLPC}(i)+P_{D2D,CLPC}(i))$$

where $P_{D2D,MAX}$ is a maximum allowed transmission power during D2D communications.

17. The method of claim 16 wherein the closed-loop power control function $P_{D2D,CLPC}(i)$ is defined as:

$$P_{D2D,CLPC}(i))=f_{D2D}(i)$$

where $f_{D2D}(i)$ is a function of a value transmitted by the second UE.

18. The method of claim 16 wherein the open-loop power control function $P_{D2D,OLPC}$ is defined as:

$$P_{D2D,OLPC}(i)=P_{0,eNB}+\alpha(L_{eNB})$$

where $P_{0,eNB}$ is a base power setting for communicating with the eNB, a is a fractional power control parameter between 0 and 1, and $L_{eNB}$ is a measured path loss value for a communications path between the device and the eNB.

19. A user equipment (UE) device, comprising:
    a radio transceiver for communicating with an evolved node B (eNB) and for device-to-device (D2D) communications;
    processing circuitry connected to the radio transceiver to:
    establish a D2D communications link with a second UE;
    adjust a transmission power during D2D communications in accordance with
    an open-loop power control function $P_{D2D,OLPC}$ defined as:

$$P_{D2D,OLPC}(i)=\min(P_{0,eNB}+\alpha(L_{eNB}),P_{0,D2D}+L_{D2D}+\text{SINR}_{target})$$

where $P_{0,eNB}$ is a base power setting for communicating with the eNB, $\alpha$ is a fractional power control parameter between 0 and 1, $L_{eNB}$ is a measured path loss value for a communications path between the device and the eNB, $P_{0,D2D}$ is a base power setting for D2D communications, $\text{SINR}_{target}$ is a target signal to interference and noise ratio set for D2D communications, and $L_{D2D}$ is a measured path loss value for a communications path between the device and the second UE.

20. The device of claim 19 wherein the processing circuitry is further to increment or decrement the transmission power in accordance with a power control command received from the second UE.

21. The device of claim 19 wherein the processing circuitry is further to set the transmission power at a value indicated by a power control command received from the second UE.

22. The device of claim 19 wherein the processing circuitry is further to increment or decrement the transmission power in accordance with a power control command received from the eNB.

23. The device of claim 19 wherein the processing circuitry is further to set the transmission power at a value indicated by a power control command received from the eNB.

* * * * *